(12) United States Patent
Doerr et al.

(10) Patent No.: US 8,511,928 B2
(45) Date of Patent: Aug. 20, 2013

(54) ERROR-PROOF TUBE CONNECTION

(75) Inventors: George E. Doerr, Clarkston, MI (US); Christopher J. Mielke, Shelby Township, MI (US); Miroslaw Zaloga, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 141 days.

(21) Appl. No.: 13/190,368

(22) Filed: Jul. 25, 2011

(65) Prior Publication Data

US 2013/0026750 A1    Jan. 31, 2013

(51) Int. Cl.
*F16B 7/10*        (2006.01)
*F16D 1/06*        (2006.01)

(52) U.S. Cl.
USPC ........................................ 403/13; 403/379.3

(58) Field of Classification Search
USPC ................... 403/12, 13, 21, 110, 378, 379.2, 403/379.3; 464/112–114; 285/81, 89–91, 285/135.5
See application file for complete search history.

(56) References Cited

U.S. PATENT DOCUMENTS

| | | | | |
|---|---|---|---|---|
| 4,780,925 | A | * | 11/1988 | Sherman |
| 4,921,367 | A | * | 5/1990 | Everett et al. .......... 403/379.3 X |
| 4,983,143 | A | * | 1/1991 | Sekine et al. |
| 5,366,413 | A | * | 11/1994 | Yamaguchi et al. |
| 6,325,724 | B1 | * | 12/2001 | Sato et al. ..................... 464/114 |
| 6,846,126 | B2 | * | 1/2005 | Parent ........................ 403/379.3 |
| 2010/0278655 | A1 | * | 11/2010 | Kuntze-Fechner |

* cited by examiner

*Primary Examiner* — Gregory Binda
*Assistant Examiner* — Josh Skroupa

(57) ABSTRACT

An internal tube is inserted into an external tube to align first bolt holes provided through opposed walls of the external tube with second bolt holes provided through opposed walls of the internal tube. A bolt is inserted through the first bolt holes and through the second bolt holes to connect the tubes together when the bolt holes are aligned. An error-proofing clip is mounted in the internal tube and has a tongue extending from the end thereof to reach into the external tube and block the insertion of the bolt through the first bolt holes of the external tube until the insertion of the internal tube has proceeded fully to bring the first bolt holes of the external tube and the second bolt holes of the internal tube into alignment with one another, thereby preventing a premature installation of the bolt through only the first bolt holes.

16 Claims, 2 Drawing Sheets

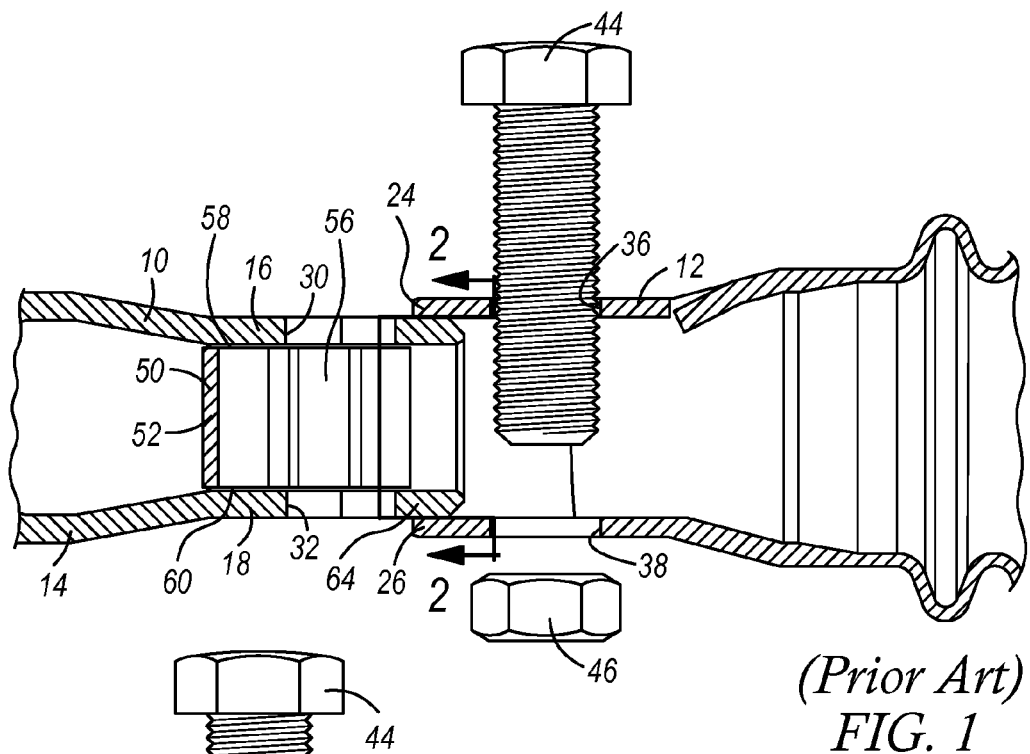
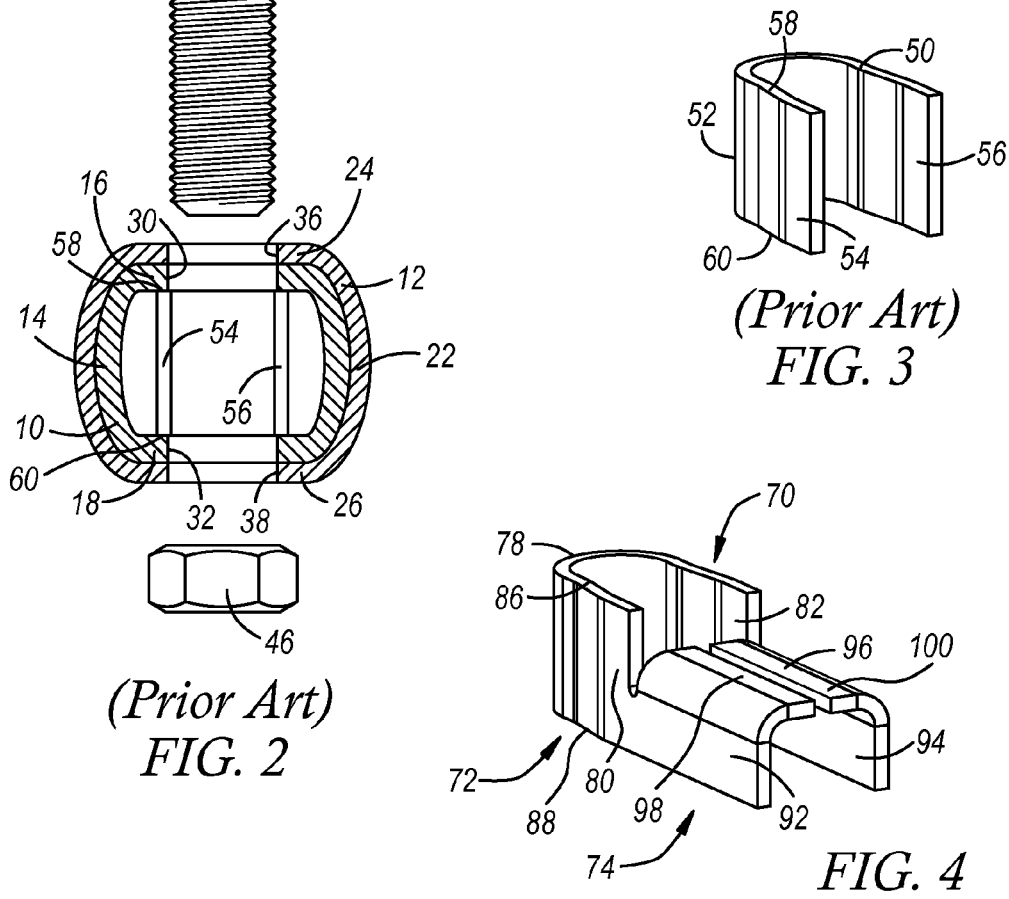
(Prior Art) FIG. 1
(Prior Art) FIG. 3
(Prior Art) FIG. 2
FIG. 4

US 8,511,928 B2

ERROR-PROOF TUBE CONNECTION

FIELD OF THE INVENTION

The present invention relates to connecting tubes together by installing a bolt through aligned holes in the tubes, and more particularly relates to an error-proof tube connection.

BACKGROUND OF THE INVENTION

Motor vehicle steering systems typically include a steering shaft assembly comprised of two or more intermediate shaft portions that extend between the steering wheel and a steering unit connected to the front wheels. The shaft portions are typically hollow tubes, including an internal tube that inserts into an external tube. When the internal tube and external tube reach their properly inserted relationship, bolt holes in the tubes align with one another and a bolt is then inserted through the aligned holes. A nut is installed and tightened on the bolt to pinch the tubes together. It is known to provide a U-shaped anti-crush clip inside the internal tube so that tightening of nut and bolt cannot crush the tubes.

After the internal tube has begun its insertion into the external tube, and prior to the internal tube reaching its fully inserted position, there can exist the possibility that an assembly operator will err by installing the bolt through only the holes of the external tube, resulting in an unsuccessful connection between the tubes.

It would be desirable to provide an error-proofing device to prevent the installation of the bolt until the internal tube has been fully inserted into the external tube and reached the proper condition where the bolt holes of the internal tube and external tube are properly in alignment with one another in readiness to receive the bolt and accomplish a successful connection. It would also be desirable that the error-proofing device would also prevent the crushing of the tubes by over tightening of the nut onto the bolt.

SUMMARY OF THE INVENTION

An internal tube is inserted into an external tube to align first bolt holes provided through opposed walls of the external tube with second bolt holes provided through opposed walls of the internal tube. A bolt is inserted through the first bolt holes and through the second bolt holes to connect the tubes together when the bolt holes are aligned. An error-proofing clip is mounted in the internal tube and has a tongue extending from the end thereof to reach into the external tube and block the insertion of the bolt through the first bolt holes of the external tube until the insertion of the internal tube has proceeded fully to bring the first bolt holes of the external tube and the second bolt holes of the internal tube into alignment with one another, thereby preventing a premature installation of the bolt through only the first bolt holes.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein:

FIG. 1 is a cross section through a prior art tube connection showing the premature installation of a bolt resulting in an unsuccessful connection of the tubes.

FIG. 2 is a section view taken in the direction of arrows 2-2 of FIG. 1.

FIG. 3 is a perspective view of a prior art anti-crush clip.

FIG. 4 is a perspective view of an error-proofing clip of the present invention.

DETAILED DESCRIPTION OF THE EXEMPLARY EMBODIMENTS

Figure 5:
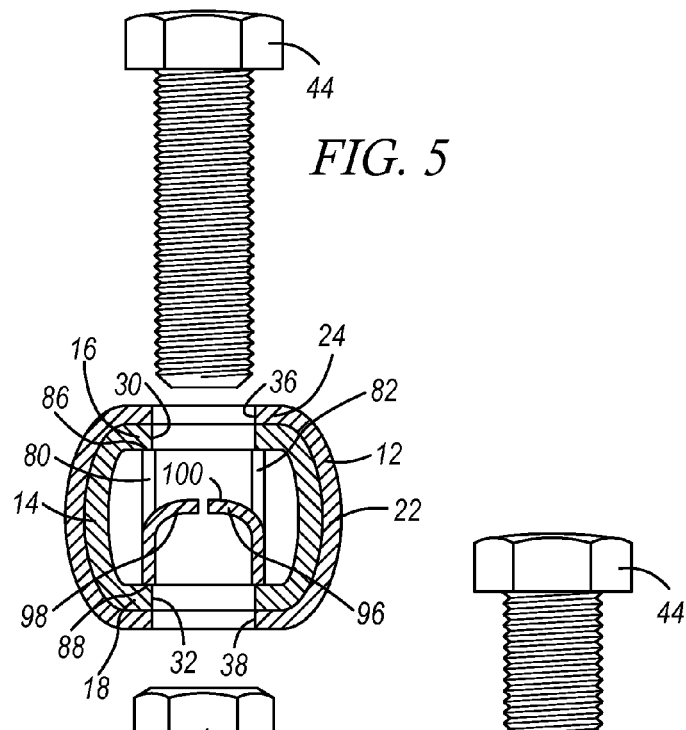
FIG. 5 is a section view taken in the direction of arrows 5-5 of FIG. 6, and shows the error-proofing clip of FIG. 4 installed in the internal tube.

The following description of certain exemplary embodiments is merely exemplary in nature and is not intended to limit the invention, its application, or uses.

FIGS. 1, 2, and 3 show a prior art connection between an internal hollow shaft or internal tube 10 and an external hollow shaft or external tube 12. Internal tube 10 includes a tube wall 14 which is circular in cross section, but the end of internal tube 10 is formed to have diametrically opposed flat wall portions 16 and 18, as shown in FIG. 2. External tube 12 has a tube wall 22 which is circular in cross section, but the end of external tube 12 is formed to provide diametrically opposed flat wall portions 24 and 26 as shown in FIG. 2. The opposed flat wall portions 16 and 18 of the internal tube 12 have bolt holes 30 and 32 there through. Likewise, the opposed flat wall portions 24 and 26 of the external tube 12 have bolt holes 36 and 38. FIG. 2 shows the internal tube 10 properly inserted into the outer tube 12 so that the bolt holes 36 and 38 of the external tube 12 have become fully aligned with the bolt holes 30 and 32 of the internal tube 10. Accordingly, a bolt 44 can be installed through the aligned bolt holes 30, 32, 36, and 38, and then nut 46 can be installed to pinch the external tube 12 onto the internal tube 10, thereby completing the successful connection between the two tubes.

FIG. 3 shows a prior art anti-crush clip 50 which is U-shaped and has a base wall 52 and spaced apart legs 54 and 56. As seen in FIGS. 2 and 3, the clip 50 is press fit into the inside of the internal tube 10, with portions 58 and 60 of the clip 50 engaging with the opposed flat wall portions 16 and 18 of the internal tube. In addition, the spaced apart legs 54 and 56 are straddling the bolt holes 30, 32, 36 and 38.

FIG. 1 shows a false alignment of the tubes 10 and 12 which can result in an unsuccessful connection between the tubes. In FIG. 1, tip 64 of the internal tube 10 is part way inserted into the external tube 12, creating only a small length of overlap between the internal tube 10 and the external tube 12. In some instances, an assembly operator can mistake this small degree of insertion as being a full insertion of the tubes. If the operator then prematurely installs the bolt 44, the bolt 44 is extending only through the bolt holes 36 and 38 of the external tube 12 and is missing the bolt holes 30 and 32 of the internal tube 10. In this event, the connection between the internal tube 10 and the external tube 12 is not successful. Furthermore the tubes can become crushed when the nut 46 is tightened.

Figure 6:
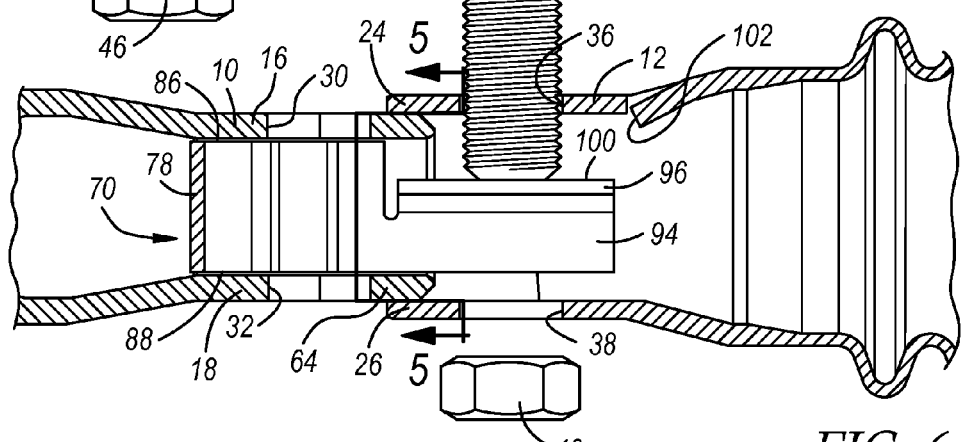
FIG. 6 is a view similar to FIG. 1 but showing the error-proofing clip preventing a premature installation of a connecting bolt.

Our invention, shown in FIGS. 4, 5, and 6, provides an improved connector clip for installation into the internal tube 10 that will provide a visual and tactile signal to the assembly operator that the tubes 10 and 12 are not properly inserted. In addition, the connector clip will physically block the premature insertion of the bolt 44.

Referring now to FIG. 4, connector clip, generally indicated at 70 includes an anti-crush portion, generally indicated at 72, and an error-proofing portion, generally indicated at 74. The connector clip 70 is constructed of stamped metal and bent to a U-shape including a base wall 78 and spaced apart legs 80 and 82. Anti-crush end faces 86 and 88 of the spaced apart legs 80 and 82 engage in press fit with the opposed flat walls portions 16 and 18 of the internal tube 10. Distal ends 92 and 94 of the legs 80 and 82 are bent downwardly toward one another forming abutment arms 96 and 98.

FIGS. 5 and 6 show the connector clip 70 installed in the internal tube 10. The connector clip 70 is inserted into the internal tube 10 in press fit relation, with the anti-crush end walls 86 and 88 respectively engaging with the opposed flat wall portions 16 and 18 of the internal tube 10. And, as shown in FIGS. 5 and 6 the error-proofing portion 74 of the connector clip 70, particularly the abutment arms 96 and 98, provide a tongue 100 extending outwardly beyond the tip 64 of the inner internal tube 10.

FIG. 6, is similar to FIG. 3 and shows the internal tube 10 only partially inserted into the external tube 12, with only the tip 64 of the internal tube 10 overlapping with the surrounding wall of the external tube 12. As seen in FIG. 6, an assembly operator is attempting to insert the bolt 44 to connect the tubes 10 and 12 together. However, as seen in FIG. 6, the bolt 44 has been inserted through the bolt hole 36 of flat wall portion 24 but has come into engagement with the tongue 100 formed by the abutment arms 96 and 98 of the connector clip 70. Thus, the tongue 100 will block the bolt 44 from further insertion where it could reach the bolt hole 38. Accordingly the assembly operator will experience tactile feedback signaling him that the tubes 10 and 12 have not been fully inserted.

In addition, it is desirable that the tongue 100 formed by abutment arms 96 and 98 be coated a bright color such as red, orange, or yellow so that even before the operator attempts to insert the bolt 44, the presence of the bright color visible through the bolt hole 36 will provide a visual feedback to the assembly operator advising that the tubes 10 and 12 have not been fully inserted. The coating can be paint, or a colored tape or appliqué, and is applied to both the top and bottoms of the abutment arms 96 and 98 so as to be visible through either of the bolt holes 36 or 38.

Figure 7:
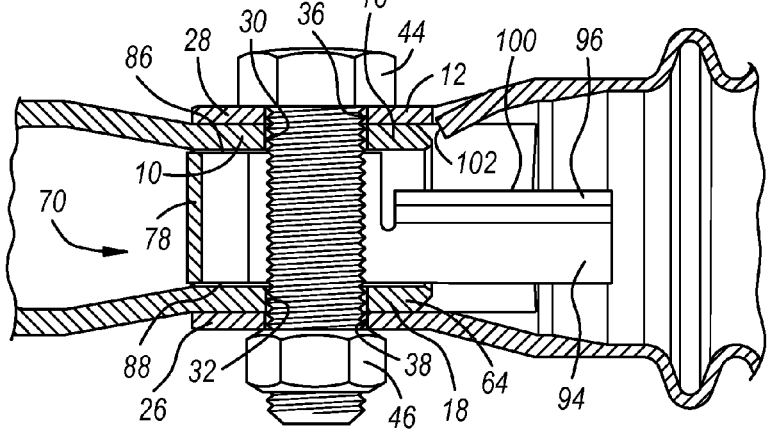
FIG. 7 is a view showing a successful connection of the internal and external tubes.

Accordingly, the operator, having been advised that the tubes 10 and 12 are not fully inserted relative one another, will withdraw the bolt 44, and further insert the internal tube 10 into the external tube 12 until the proper alignment is obtained. When the proper alignment is obtained, the tongue 100 will no longer be visible through the bolt hole 36 or 38. The bolt 44 can then travel progressively through the bolt hole 36, then bolt hole 30, then bolt hole 32, then bolt hole 38 to the position of FIG. 7. Once the bolt is properly installed through the aligned bolt holes 30, 32, 36, and 38, the nut 46 may be installed and tightened to accomplish a reliable connection between the tubes 10 and 12. Upon tightening of the nut 46, the outer tube 12 will be pinched together, thus also pinching the internal tube 10 onto the end faces 86 and 88 of the clip 70. Connector clip 70 will then protect the tubes 10 and 12 from being collapsed by an over tightening of the nut 46.

FIG. 6 also shows that the outer tube 12 has a tang 102 struck therefrom and extending into the oncoming path of the incoming internal tube 10 to provide a stop for engagement by the tip 64 of the internal tube 10, thereby limiting the possibility of an over insertion of the internal tube 10 into the external tube 12.

Thus, it is seen that the invention has provided a new and improved connection between an internal tube and an external tube, by blocking the insertion of the connecting bolt until the tubes are fully inserted in relation to one another, and further provides a tactile and visible indicator informing the assembly operator that a premature insertion of the bolt has been attempted, so that the operator can try again to achieve a successful connection.

Although the foregoing description speaks of inserting the internal tube into the inside of the external tube, it will be understood that the external tube can be inserted over the outside of the internal tube, or both tubes can be moved toward one another to achieve the insertion and alignment of the bolt holes.

In the foregoing description, the internal tube and external tube have opposed flat wall portions engaging one another, effectively preventing rotation between the two tubes, and also assisting in the rotary alignment of the tubes when the internal tube is inserted into the exterior tube. However, it will be understood that the error-proofing connector of this invention can also be employed in tubes that are round in cross section, rather than having opposed flat wall portions.

In FIG. 4, the tongue 100 is formed by the cooperation of the two abutment arms 96 and 98. However, it will be understood that only one arm can effectively provide a tongue to block the premature insertion of the bolt 44.

What is claimed is:

1. A connection between an internal tube and an external tube in which the internal tube is inserted into the external tube, comprising:
   first bolt holes provided through opposed walls of the external tube;
   second bolt holes provided through opposed walls of the internal tube and aligning with the first bolt holes of the external tube when the internal tube is fully and properly inserted into the external tube;
   a bolt to be inserted through the first bolt holes and through the second bolt holes to connect the tubes together when the bolt holes are aligned;
   and an error-proofing clip mounted in the internal tube and having a tongue extending from an end thereof to reach into the external tube and block the insertion of the bolt through the first bolt holes of the external tube until the insertion of the internal tube has proceeded fully to bring the first bolt holes of the external tube and the second bolt holes of the internal tube into alignment with one another, thereby preventing a premature installation of the bolt through only the first bolt holes.

2. The connection of claim 1 further comprising the error-proofing clip mounted in the internal tube also engaging with the opposed walls of the internal tube to support the internal tube against being crushed by the tightening of a nut onto the bolt.

3. The connection of claim 1 further comprising the opposed walls of the internal tube and the opposed walls of the external tube each being flat walls to engage with one another and thereby prevent rotation between the internal tube and the external tube.

4. The connection of claim 3 further comprising the error-proofing clip mounted in the internal tube engaging with the opposed flat walls of the internal tube to support the internal tube against being crushed by the tightening of a nut onto the bolt.

5. The connection of claim 1 further comprising the error-proofing clip being of one-piece construction and having end walls mounted by press fit into the internal tube and engaging with the opposed walls of the internal tube adjacent the bolt holes to prevent the tightening of a nut on the bolt from crushing the internal tube, and at least one abutment arm formed integral with one of the end walls to provide the tongue projecting outwardly from the end of the internal tube.

6. The connection of claim 1 further comprising the tongue being visible through the bolt holes of either of the opposed walls of the external tube only when the internal tube has not yet been fully inserted into the external tube to bring the first bolt hole and second bolt holes into alignment with one another, thereby providing a visible indicator informing an assembly operator that the internal tube has not yet been fully inserted into the external tube.

7. The connection of claim 6 further comprising the tongue having a colored coating to improve the visibility of the tongue when viewed through the first bolt holes.

8. A connection between an internal tube and an external tube in which the internal tube is inserted into the external tube, comprising:
the internal tube having opposed flat walls with bolt holes extending therethrough;
the external tube having opposed flat walls with bolt holes extending therethrough;
the bolt holes of the internal and external tubes aligning with one another when the internal tube is fully and properly inserted into the external tube;
a bolt to be inserted through the aligned bolt holes to connect the tubes together when the bolt holes are aligned;
a nut to be installed on the bolt and tightened to squeeze the opposed flat walls of the external tube against the opposed flat walls of the internal tube;
and an error-proofing clip mounted in the internal tube and having a tongue extending from an end thereof to reach into the external tube and block the insertion of the bolt through the external tube until the insertion of the internal tube has proceeded fully to bring the bolt holes of the external tube and the bolt holes of the internal tube into alignment with one another, thereby preventing a premature installation of the bolt, and said error-proofing clip also having end walls engaging with the opposed flat walls of the internal tube to support the opposed flat walls against being crushed together upon an over tightening of the nut on the bolt.

9. The connection of claim 8 further comprising the error-proofing clip being of one-piece construction and having the end walls mounted by press fit into the internal tube and engaging with the opposed walls of the internal tube adjacent the bolt holes to prevent the tightening of a nut on the bolt from crushing the internal tube, and at least one abutment arm formed integral with the end walls to provide the tongue.

10. The connection of claim 8 further comprising the tongue being visible through the bolt holes of either of the opposed walls of the external tube only when the internal tube has not yet been fully inserted into the external tube to bring the bolt holes into alignment with one another, thereby providing a visible indicator informing an assembly operator that the internal tube has not yet been fully inserted into the external tube.

11. The connection of claim 10 further comprising the tongue having a brightly colored coating to improve the visibility of the tongue when viewed through the bolt holes.

12. An error-proofing clip for assuring the connection together of an internal tube and an external tube in which the internal tube is inserted into the external tube and then a bolt is installed through bolt holes provided in the internal tube and the external tube, the bolt holes coming into alignment with one another only when the internal tube is fully inserted, comprising:
a one-piece metal construction having end walls press fit into the internal tube closely adjacent the bolt holes provided in the internal tube to support the internal tube against being crushed upon installation of the bolt and tightening of a nut, and a tongue projecting outwardly from an end of the internal tube to reach into an end of the external tube and block the bolt holes provided in the external tube until the internal tube and the external tube have come into alignment with one another when the internal tube is fully inserted.

13. The error-proofing clip of claim 12 further comprising the one-piece metal construction being a U-shaped clip having a base wall providing the end walls press fit with the internal tube and a pair of spaced apart legs straddling the bolt holes of the internal tube, said legs each having integral abutment arms cooperating to form the tongue.

14. The error-proofing clip of claim 12 further comprising the one-piece metal construction being a U-shaped clip having a base wall providing the end walls press fit with the internal tube, and a pair of spaced apart legs straddling the bolt holes of the internal tube, at least one of the legs having an integral abutment arm forming the tongue.

15. The error-proofing clip of claim 12 further comprising the tongue being visible through either of the bolt holes in the external tube until the internal tube and the external tube have come into alignment with one another when the internal tube is fully inserted.

16. The error-proofing clip of claim 15 further comprising the tongue having a colored coating to improve the visibility of the tongue when viewed through the bolt holes.

* * * * *